(12) United States Patent
Koyanagi et al.

(10) Patent No.: US 11,218,604 B2
(45) Date of Patent: Jan. 4, 2022

(54) INFORMATION PROCESSING APPARATUS DETERMINING IDENTITY BETWEEN READING JOBS, IMAGE READING APPARATUS, AND NON-TRANSITORY COMPUTER READABLE MEDIUM STORING PROGRAM

(71) Applicant: FUJIFILM Business Innovation Corp., Tokyo (JP)

(72) Inventors: Takeyasu Koyanagi, Kanagawa (JP); Jun Kimura, Kanagawa (JP); Atsuhiro Itoh, Kanagawa (JP); Yuki Iguchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 280 days.

(21) Appl. No.: 16/208,593

(22) Filed: Dec. 4, 2018

(65) Prior Publication Data

US 2019/0281174 A1 Sep. 12, 2019

(30) Foreign Application Priority Data

Mar. 9, 2018 (JP) .............................. JP2018-042618

(51) Int. Cl.
*H04N 1/00* (2006.01)

(52) U.S. Cl.
CPC ..... *H04N 1/00241* (2013.01); *H04N 1/00957* (2013.01)

(58) Field of Classification Search
None
See application file for complete search history.

(56) References Cited

U.S. PATENT DOCUMENTS

| 7,724,387 | B2 * | 5/2010 | Ochiai ..................... | H04N 1/40 358/1.15 |
| 8,305,657 | B2 * | 11/2012 | Shimizu ............. | H04N 1/00413 358/498 |
| 8,630,029 | B2 | 1/2014 | Shimizu et al. | |
| 2005/0105145 | A1 * | 5/2005 | Yoo ...................... | H04N 1/0062 358/498 |
| 2006/0132821 | A1 * | 6/2006 | Nonaka .............. | H04N 1/00127 358/1.13 |

(Continued)

FOREIGN PATENT DOCUMENTS

| JP | 2007109155 | 4/2007 |
| JP | 2009303093 | 12/2009 |

OTHER PUBLICATIONS

"Office Action of Japan Counterpart Application" with English translation thereof, dated Nov. 16, 2021, p. 1-p. 5.

*Primary Examiner* — Henok Shiferaw
(74) *Attorney, Agent, or Firm* — JCIPRNET

(57) ABSTRACT

An information processing apparatus includes a reading job acception section that accepts a reading job; a determination section that, in a case where the reading job acception section accepts a one page reading job subsequent to a previous one page reading job, determines an identity between the reading job and the previously accepted reading job; and a processing section that, in a case where it is determined that the identity with the previously accepted reading job exists as a result of determination of the determination section, processes the reading jobs as one reading job.

12 Claims, 6 Drawing Sheets

(56) References Cited

U.S. PATENT DOCUMENTS

| | | | |
|---|---|---|---|
| 2008/0226371 A1* | 9/2008 | Oshima | H04N 1/0443 |
| | | | 399/397 |
| 2009/0273815 A1* | 11/2009 | Hattori | H04N 1/00915 |
| | | | 358/450 |
| 2010/0245879 A1* | 9/2010 | Tsuya | H04N 1/32128 |
| | | | 358/1.13 |
| 2012/0229868 A1* | 9/2012 | Shimizu | H04N 1/00236 |
| | | | 358/403 |
| 2014/0233076 A1* | 8/2014 | Hasegawa | H04N 1/33315 |
| | | | 358/474 |
| 2016/0366287 A1* | 12/2016 | Murata | H04N 1/00411 |

* cited by examiner

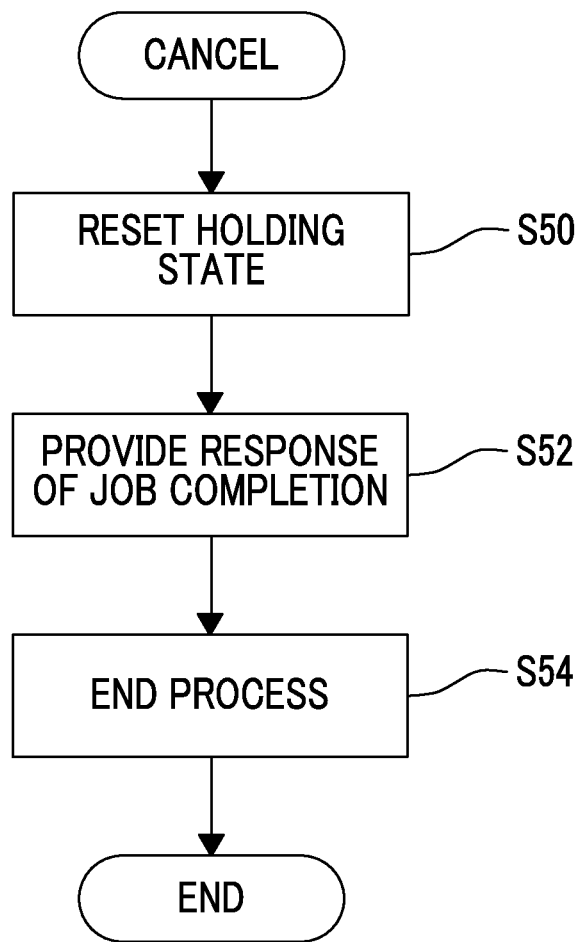

INFORMATION PROCESSING APPARATUS DETERMINING IDENTITY BETWEEN READING JOBS, IMAGE READING APPARATUS, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2018-042618 filed Mar. 9, 2018.

BACKGROUND

(i) Technical Field

The present invention relates to an information processing apparatus, an image reading apparatus, and a non-transitory computer readable medium storing a program.

(ii) Related Art

JP2009-303093A discloses an image processing apparatus which is configured to control paper feeding means independently of a reading start command from a host apparatus so as to start transferring of second and subsequent documents.

JP2007-109155A discloses an image forming apparatus which determines whether or not it is possible to couple a first job with one or more subsequent jobs into one job in a case where one or more subsequent jobs are received after the first job is received and until starting execution of the job, and which couples the jobs into one job and executes the coupled job in a case where it is determined that it is possible to couple the jobs into one job.

SUMMARY

However, in a case where a request to read a plurality of pages is provided in a personal computer or the like according to the related art, there is a case where the request to read is issued for each page. For example, in an Operating System (Windows OS) of Windows (registered trademark of Microsoft Corporation), a WSD is installed. The WSD is an acronym of web services on devices and is a network protocol developed by Microsoft Corporation. In addition, application software corresponding to a TWAIN standard is widely distributed. The TWAIN standard is one of standards which determine technical specifications used to read image data from application software, which is being executed on the computer, by controlling an input device such as an image scanner. Since the TWAIN standard is developed by a TWAIN Working Group, the TWAIN is an acronym of technology without an interesting name. In a case where, in an image reading apparatus, both driver software and application software (image editing software or the like) correspond to the TWAIN standard, an image is read by calling the image reading apparatus connected to the computer from the application software, and thus it is possible to immediately start edit. Here, in a case where a request to read a plurality of pieces of documents is provided by the application software corresponding to the TWAIN standard in the Windows OS, in which the image reading apparatus is installed as the WSD device, a reading job is issued for each page in the WSD. Therefore, an end process and an initialization process are necessary for each page in the image reading apparatus, and thus time until the whole documents are read is prolonged.

Aspects of non-limiting embodiments of the present disclosure relate to an information processing apparatus, an image reading apparatus, and a non-transitory computer readable medium storing a program, which are capable of reducing reading time, compared to a case where a reading job is executed for each page.

Aspects of certain non-limiting embodiments of the present disclosure overcome the above disadvantages and other disadvantages not described above. However, aspects of the non-limiting embodiments are not required to overcome the disadvantages described above, and aspects of the non-limiting embodiments of the present disclosure may not overcome any of the problems described above.

According to an aspect of the present disclosure, there is provided an information processing apparatus including: a reading job acception section that accepts a reading job; a determination section that, in a case where the reading job acception section accepts a one page reading job subsequent to a previous one page reading job, determines an identity between the reading job and the previously accepted reading job; and a processing section that, in a case where it is determined that the identity with the previously accepted reading job exists as a result of determination of the determination section, processes the reading jobs as one reading job.

Meanwhile, the reading job refers to a series of processes from start of reading to end of the reading end.

BRIEF DESCRIPTION OF THE DRAWINGS

Exemplary embodiment(s) of the present invention will be described in detail based on the following figures, wherein:

FIG. 6 is a flowchart illustrating a processing flow in a case where cancellation is generated in the exemplary embodiment of the present invention.

DETAILED DESCRIPTION

Subsequently, an exemplary embodiment of the present invention will be described in detail with reference to the accompanying drawings.

Figure 1:
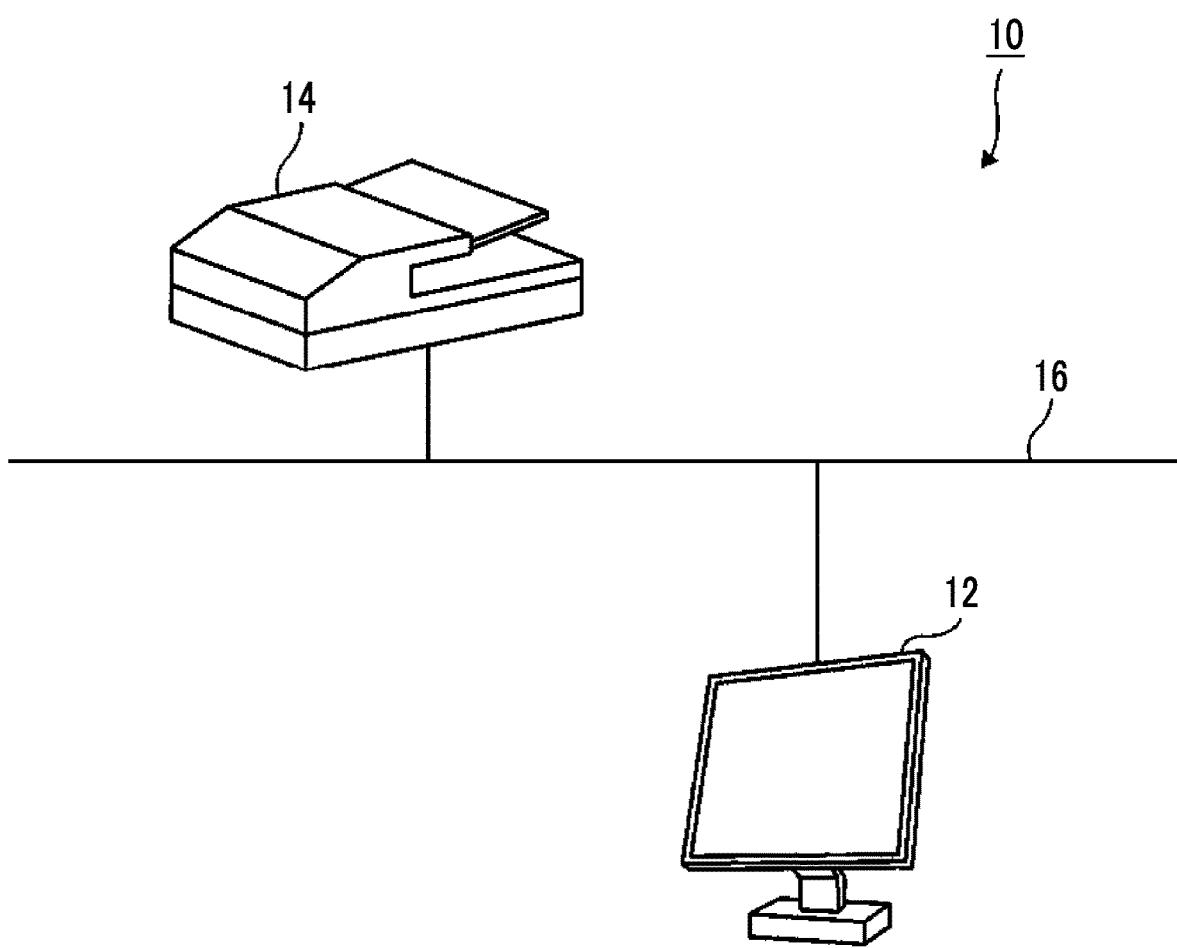
FIG. 1 is a configuration diagram illustrating an image reading system which includes an image reading apparatus according to an exemplary embodiment of the present invention.

FIG. 1 illustrates an image reading system 10 according to the exemplary embodiment of the present invention.

In the image reading system 10, a host apparatus 12 and an image reading apparatus 14 are connected to each other via a network 16. The host apparatus 12 is, for example, a personal computer, and, here, becomes a request source of a reading job.

Figure 2:
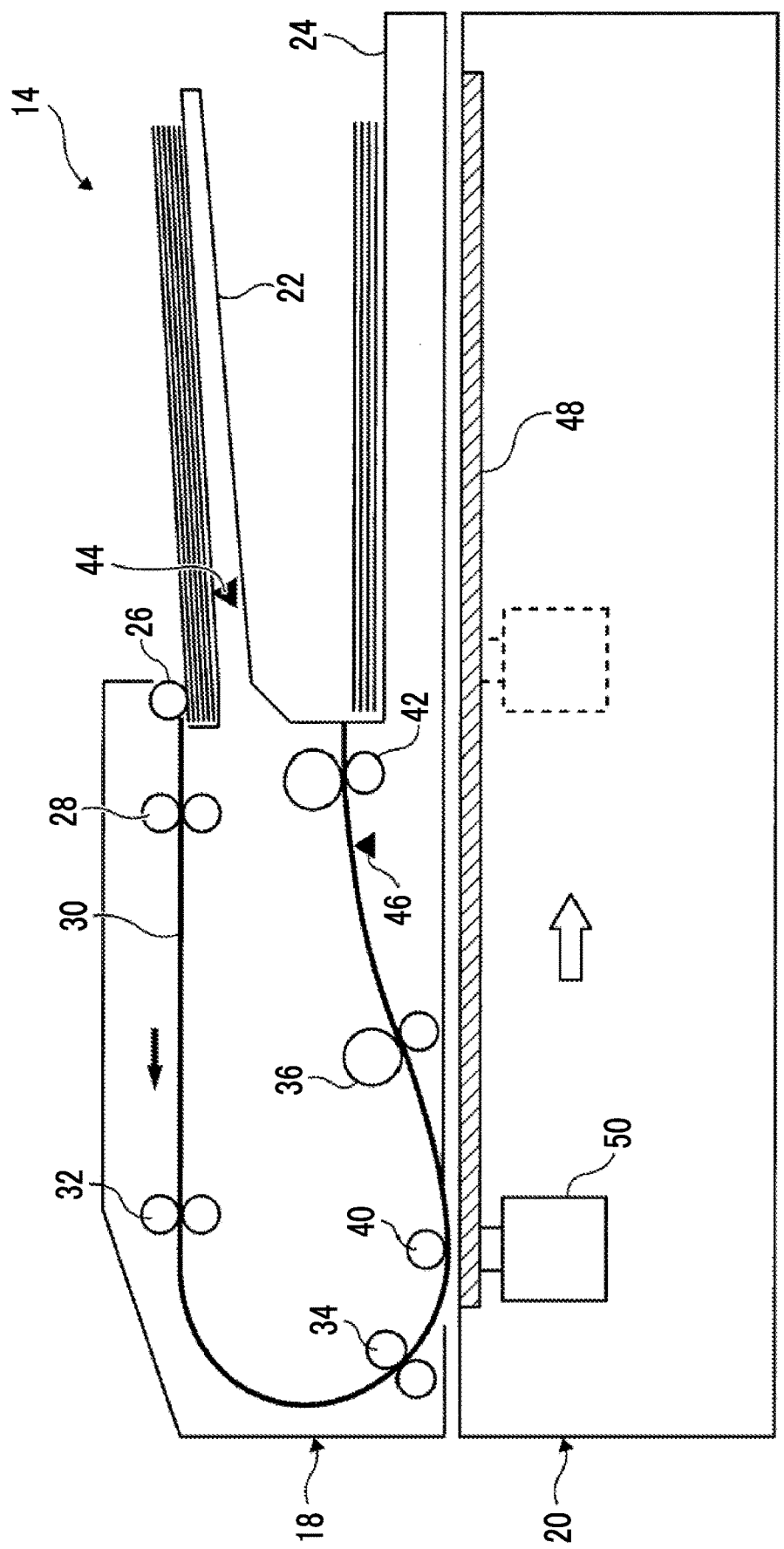
FIG. 2 is a sectional diagram illustrating the image reading apparatus according to the exemplary embodiment of the present invention.

As illustrated in FIG. 2, the image reading apparatus 14 includes an automatic document sending device 18 as an input device, and a reading device 20 which reads a document that is sent by the automatic document sending device 18.

The automatic document sending device 18 includes a recording medium storage unit 22 which loads a bundle of recording media including a plurality of recording media, and an ejected paper storage unit 24 which is provided below the recording medium storage unit 22 and which loads a completely read recording medium. In addition, the automatic document sending device 18 includes an extraction roller 26 which extracts and conveys the recording medium in the recording medium storage unit 22. Furthermore, a separation machine 28, which separates the recording media one by one, is provided on a downstream side of the extraction roller 26 in a recording medium conveyance direction. Conveyance rollers 32 to 36, a platen roller 40, and a discharge roller 42 are sequentially provided from an upstream side in the recording medium conveyance direction on a conveyance path 30 through which the recording medium is conveyed. The platen roller 40 presses the recording medium, which is being read by the reading device 20, from above. The discharge roller 42 conveys the read recording medium, and furthermore, discharges the recording medium to the ejected paper storage unit 24.

A first sensor 44 is provided in the recording medium storage unit 22, and detects whether or not the recording medium exists in the recording medium storage unit 22. The first sensor 44 may be a mechanical type in which an actuator is driven in a case where the recording medium exists in the recording medium storage unit 22, and may be an optical type in which a light emitting element and a light receiving element are provided and in which detection is performed according to whether or not light is blocked.

A second sensor 46 is provided on an upstream side of the ejected paper storage unit 24, and detects whether or not the recording medium is ejected. The second sensor 46 may be a mechanical type in which the actuator is driven in a case where the recording medium passes through the second sensor 46, and may be an optical type in which the light emitting element and the light receiving element are provided and in which the passage of the recording medium is detected according to whether or not light is blocked.

In addition, a sheet of platen glass 48 is provided on an upper surface of the reading device 20. An image reading unit 50 is disposed below the platen glass 48. The image reading unit 50 is configured to stop below the platen roller 40 and to read a document, which is sent by the automatic document sending device 18 (automatic document sending mode), or is configured to move along the platen glass 48 and to read a document which is placed on the platen glass 48 (platen mode).

Figure 3:
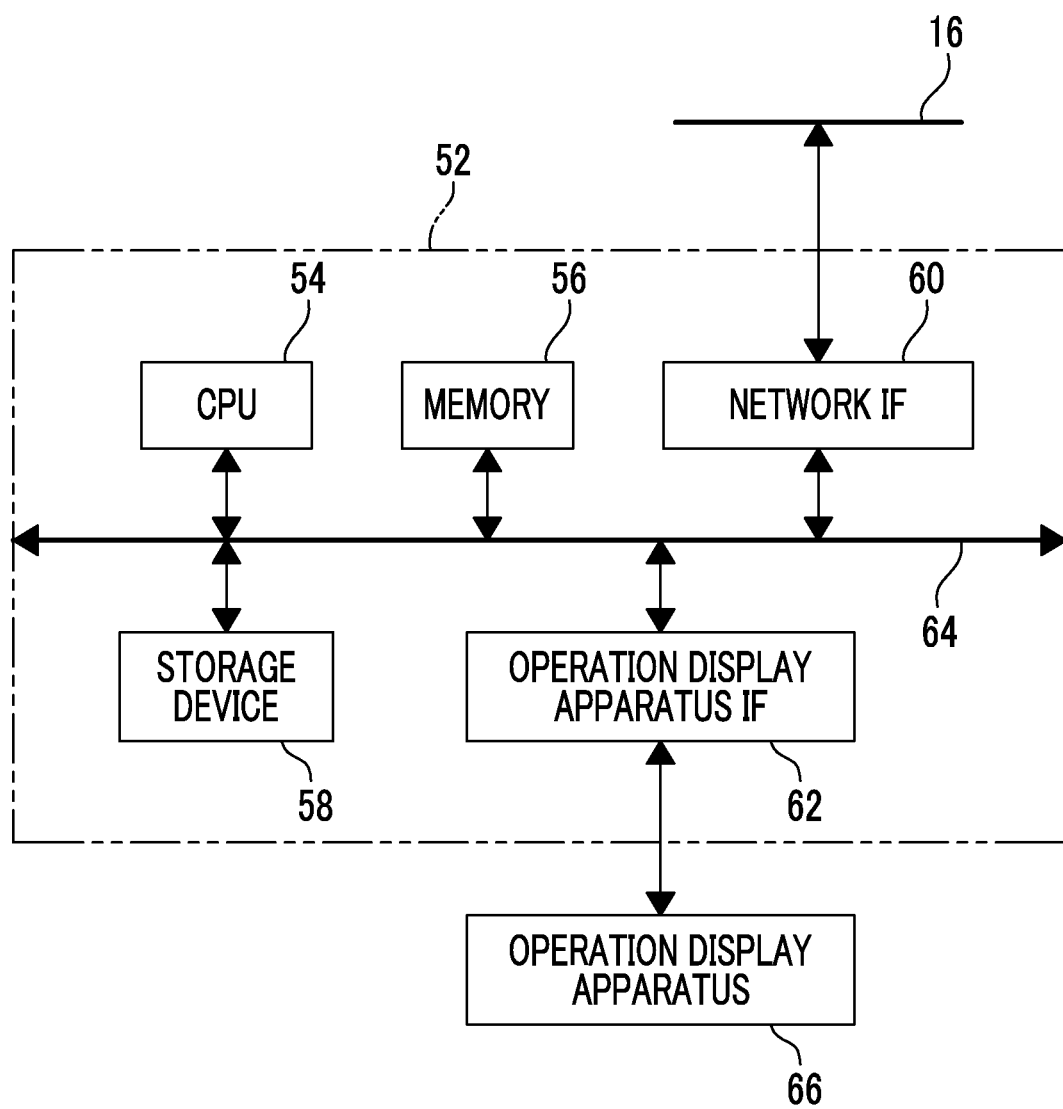
FIG. 3 is a block diagram illustrating a control unit of a host apparatus used in the exemplary embodiment of the present invention.

FIG. 3 illustrates a hardware configuration of a control unit 52 in the host apparatus 12.

The control unit 52 includes a CPU 54, a memory 56, a storage device 58, a network interface 60, and an operation display apparatus interface 62. The CPU 54, the memory 56, the storage device 58, the network interface 60, and the operation display apparatus interface 62 are connected through a control bus 64.

The CPU 54 performs a predetermined process based on a control program stored in the memory 56. The network interface 60 is connected to the above-described network 16.

The storage device 58 includes, for example, a hard disk or the like. In the storage device 58, a Windows OS is installed, and a scan driver corresponding to a TWAIN standard and application software (for example, Docuworks, Docuworks is a registered trademark of Fuji Xerox Co., Ltd) corresponding to the TWAIN standard are installed and stored. In the Windows OS, the image reading apparatus 14 is registered as a WSD device. In a case where a request to read a plurality of pieces of documents is output to the image reading apparatus 14 by the application software corresponding to the TWAIN standard, a reading job is issued for each page in the WSD.

An operation display apparatus 66 is connected to the operation display apparatus interface 62. The operation display apparatus 66 is configured such that, for example, a touch panel is combined with a liquid crystal panel, an operation instruction is provided through a displayed operation unit, or an operation result is displayed.

Figure 4:
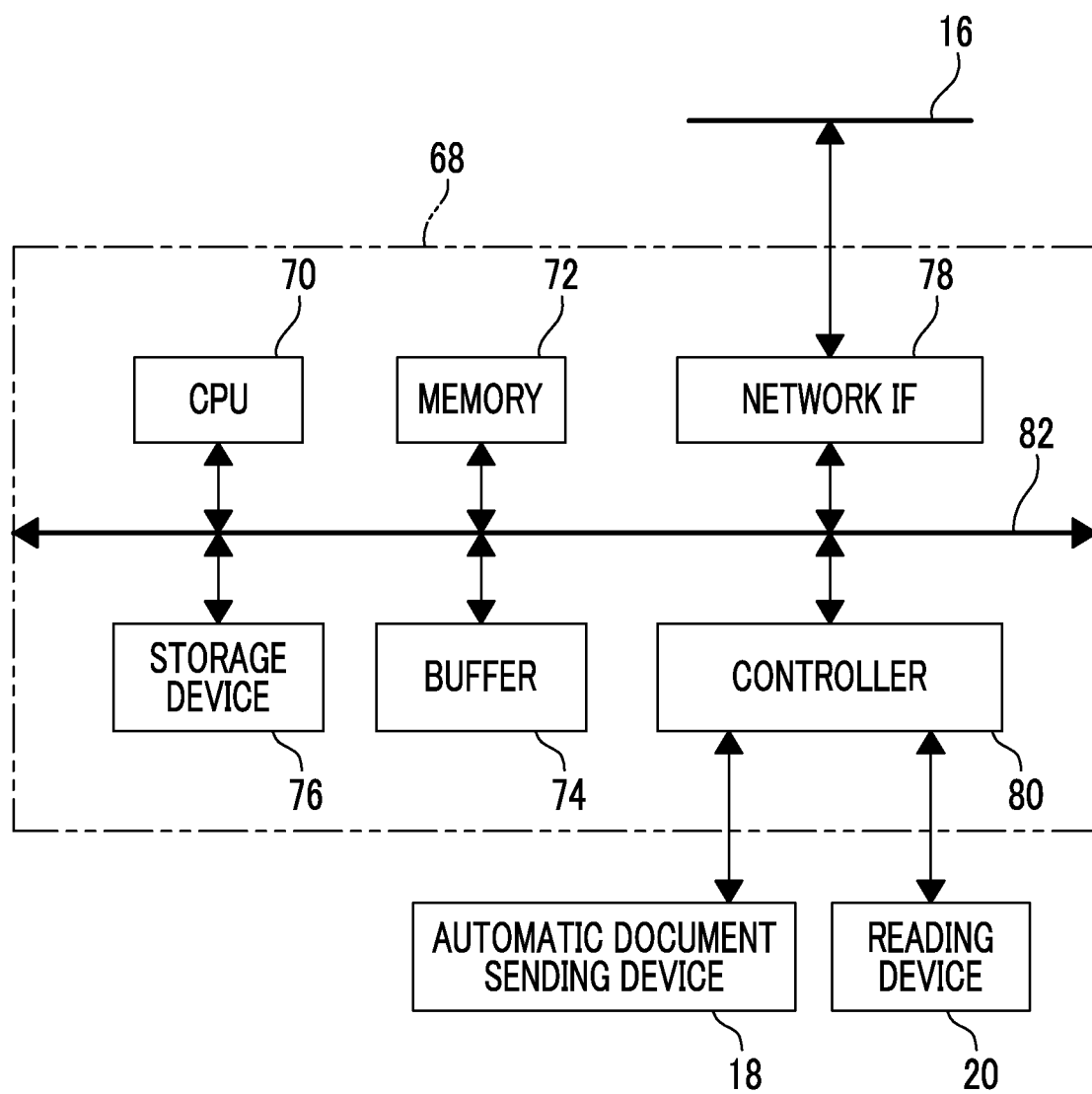
FIG. 4 is a block diagram illustrating a control unit of the image reading apparatus according to the exemplary embodiment of the present invention.

FIG. 4 is a block diagram illustrating hardware configuration of a control unit 68 of the image reading apparatus 14. Here, the control unit 68 is formed as an information processing apparatus.

The control unit 68 includes a CPU 70, a memory 72, a buffer 74, a storage device 76, a network interface 78, and a controller 80. The CPU 70, the memory 72, the buffer 74, the storage device 76, the network interface 78, and the controller 80 are connected to each other through a control bus 82.

The CPU 70 performs a predetermined process based on a control program stored in the memory 72. The network interface 78 is connected to the above-described network 16. The buffer 74 temporarily stores a read document image.

The controller 80 is connected to the above-described automatic document sending device 18 and the reading device 20, and controls the automatic document sending device 18 and the reading device 20.

Figure 5:
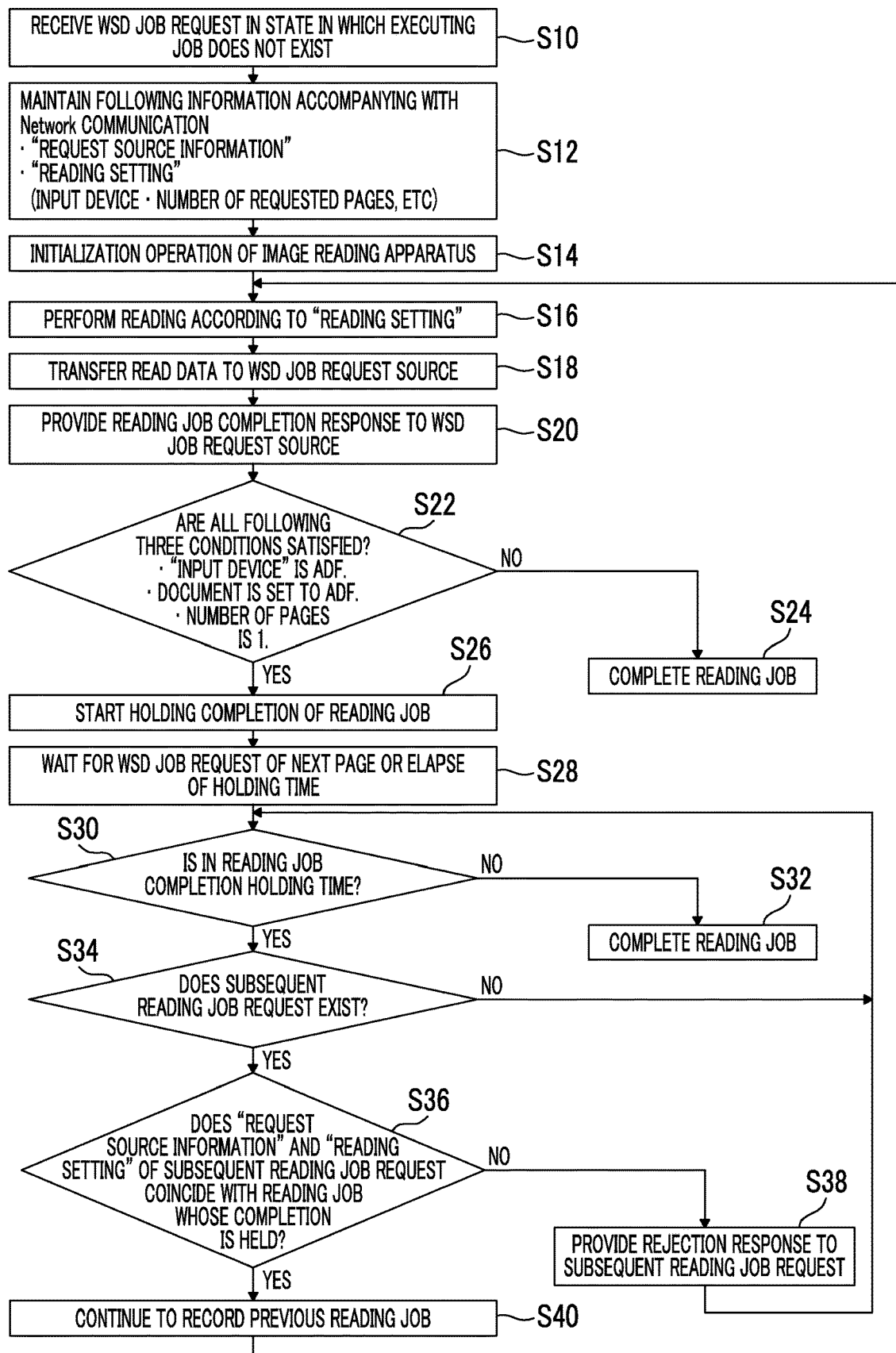
FIG. 5 is a flowchart illustrating a processing flow of the image reading apparatus in the exemplary embodiment of the present invention.

FIG. 5 is a flowchart illustrating the control program executed by the CPU 70 of the image reading apparatus 14.

First, in step S10, a WSD job request is received (accepted) in a state in which an executing job does not exist. In subsequent step S12, following pieces of information accompanying with network communication is maintained in, for example, the memory 72.

Request source information: ID or the like of a host apparatus 12 which is the request source.

Reading setting information: information which indicates whether or not an automatic document sending device (hereinafter, referred to as an ADF) is set as the input device, whether or not a platen mode (setting for reading a document placed on the platen glass 48) is set, and the number of requested pages. For example, in a case where a job is started and a memory resource is specified, it is possible to include information such as a color type (color, white, or black) relevant to restriction of a resource, or a size (A4, A3, or the like) of a document to be read. Here, in a case of the WSD job, the ADF is set as the input device and the number of requested pages is set to 1.

In subsequent step S14, initialization of the image reading apparatus 14 is performed through the controller 80. The initialization is, for example, a process for locating the image reading unit 50 in a designated location for starting reading along the input device, setting up the document to a state of waiting for reading, and previously performing a process for adjusting an image quality such as a brightness preparation.

In subsequent step S16, one page of the document placed on the ADF is read according to reading setting that is acquired in step S10. In subsequent step S18, the reading data, which is read in step S16, is transferred to a WSD request source. In subsequent step S20, a signal indicative of completion of the reading job is generated based on an output from the second sensor 46, and the signal is transmitted to the WSD job request source.

In subsequent step S22, it is determined whether or not all subsequent conditions are satisfied based on data acquired in step S10 and an output from the first sensor 44.

The input device is the ADF.

The document is set on the ADF.

The number of requested pages is 1.

That is, a case where the conditions are satisfied indicates a case where a fact that the reading job is sent by the WSD in a state in which the document is set on the ADF.

In a case where it is determined that any one of the conditions is lacking in step S22, the process proceeds to step S24, an end process is performed due to completion of reading, and the process ends. The end process includes, for example, transitioning a holding state, which will be described later, to an execution state, returning the image reading unit 50 to a home position, providing job completion response to the host apparatus 12 which is the request source, performing a job end process of the image reading apparatus 14, and the like.

In contrast, in a case where it is determined that all the conditions are satisfied in step S22, the process proceeds to subsequent step S26. In step S26, completion of the reading job starts to be held. In subsequent step S28, a process for waiting for acception of the WSD job request of a next page or waiting for the elapse of a predetermined holding time is performed. The holding time is, for example, approximately 3 seconds.

In subsequent step S30, whether or not being in reading job holding time is determined. In step S30, in a case where it is determined to be not in the reading job holding time, that is, the reading job holding time elapses, the process proceeds to step S32, the end process is performed due to completion of reading, and the process ends.

In step S30, in a case where it is determined to be in the reading job holding time, the process proceeds to subsequent step S34. In step S34, it is determined whether or not a subsequent reading job request exists. In a case where it is determined that the subsequent reading job request does not exist in step S34, the process returns to step S30.

In contrast, in a case where it is determined that the subsequent reading job request exists in step S34, the process proceeds to subsequent step S36. In step S36, in order to determine identity between a previous reading job request and the subsequent reading job request, it is determined whether or not the request source information and the reading setting coincide with the reading job (previous reading job) whose completion is held.

In a case where the identity does not exist, that is, it is determined that anyone of the request source information and the reading setting does not coincide with the reading job whose completion is held in step S36, the process proceeds to step S38. In step S38, a rejection response is provided with respect to the subsequent reading job. The case where the identity does not exist indicates an interruption request from another host apparatus. An outflow of image data is prevented through rejection, and thus safety is secured. In a case where the process in step S38 ends, the process returns to step S30.

In a case where the identity exists, that is, it is determined that the request source information and the reading setting coincide with the reading job whose completion is held in step S36, the process proceeds to step S40. In step S40, recording of the previous reading job is continued. That is, the previous reading job and a current reading job are stored in, for example, the storage device 76 as one reading job. Therefore, a preservation area of the storage device 76 is not compressed, and thus reading becomes easy. In a case where the process in step S40 ends, the process returns to step S16.

FIG. 6 is a flowchart illustrating a process performed in a case where a cancellation request is received while the reading job is performed.

First, in step S50, the holding state transitions to the execution state. In subsequent step S52, the end process of the image reading apparatus 14 is performed. In subsequent step S54, a cancellation execution response is provided with respect to the host apparatus 12 which is the request source. Furthermore, in subsequent step S54, the job end process of the image reading apparatus 14 is performed, and the process ends. Meanwhile, even in a case where the cancellation request is received after the final document is read, there is a case where the job normally ends.

Meanwhile, in the exemplary embodiment, the holding time until the subsequent reading job request is accepted is fixed. However, it is possible to set the holding time to be changeable. For example, it is possible to display, check, and, furthermore, change apparatus setting information on the automatic document sending device 18 of the image reading apparatus 14. In addition, the holding time may be displayed and changed on the operation display apparatus 66 of the host apparatus 12 using a browser or a scanner driver.

In addition, in the exemplary embodiment, an image reading-dedicated scanner is provided as an example of the image processing apparatus. The exemplary embodiment is not limited thereto and, for example, a device, in which copying and printing are possible in addition to image reading, may be used. In addition, although a personal computer is provided as an example of the host apparatus, a device, such as a smart phone, may be included in the host apparatus.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a reading job acception processor that accepts a reading job;
   a determination processor that, in a case where the reading job acception processor accepts a one page reading job subsequent to a previous one page reading job, determines an identity between the reading job and the previously accepted reading job; and
   a control processor that, in a case where it is determined that the identity with the previously accepted reading job exists as a result of determination of the determination processor, processes the reading jobs as one reading job, wherein, in a case where it is determined that the identity with the previously accepted reading job does not exist as the result of the determination of the determination processor, the control processor rejects the reading job.

2. The information processing apparatus according to claim 1, wherein the determination processor holds end of the previously accepted reading job for predetermined time.

3. The information processing apparatus according to claim 2, wherein the determination processor determines the identity with the accepted reading job in the predetermined time.

4. The information processing apparatus according to claim 1, wherein, in a case where the determination processor determines that the identity with the accepted reading job does not exist in predetermined time, the control processor rejects the reading job.

5. The information processing apparatus according to claim 1, wherein, in a case where it is determined that the identity with the previously accepted reading job exists, the control processor stores history as one reading job.

6. The information processing apparatus according to claim 2, wherein, in a case where it is determined that the identity with the previously accepted reading job exists, the control processor stores history as one reading job.

7. The information processing apparatus according to claim 3, wherein, in a case where it is determined that the identity with the previously accepted reading job exists, the control processor stores history as one reading job.

8. The information processing apparatus according to claim 1, wherein, in a case where it is determined that the identity with the previously accepted reading job exists, the control processor stores history as one reading job.

9. The information processing apparatus according to claim 4, wherein, in a case where it is determined that the identity with the previously accepted reading job exists, the control processor stores history as one reading job.

10. An image reading apparatus comprising:

an automatic document sending device that sends a document;

a document reading processor that reads a document, which is sent by the automatic document sending device, or a placed document; and an information processing apparatus that processes information of reading job which is executed by the document reading processor, wherein the information processing apparatus includes, a reading job acception processor that accepts a reading job;

a determination processor that, in a case where the reading job acception processor accepts a one page reading job subsequent to a previous one page reading job, determines an identity between the reading job and the previously accepted reading job; and a control processor that, in a case where it is determined that the identity with the previously accepted reading job exists as a result of determination of the determination processor, processes the reading jobs as one reading job, wherein, in a case where it is determined that the identity with the previously accepted reading job does not exist as the result of the determination of the determination processor, the control processor rejects the reading job.

11. The image reading apparatus according to claim 10, wherein the determination processor determines whether or not a document reading by the automatic document sending device is set to a requested reading job.

12. A non-transitory computer readable medium storing a program causing a computer to execute a process, the process comprising:

accepting a reading job;

determining an identity between the reading job and a previously accepted reading job in a case where one page reading job is accepted subsequent to the previous one page reading job;

processing the reading jobs as one reading job in a case where it is determined that the identity with the previously accepted reading job exists; and rejecting the reading job in a case where it is determined that the identity with the previously accepted reading job does not exist.

* * * * *